United States Patent
Chen et al.

(10) Patent No.: US 12,125,193 B2
(45) Date of Patent: Oct. 22, 2024

(54) METHOD FOR DETECTING DEFECT IN PRODUCTS AND ELECTRONIC DEVICE USING METHOD

(71) Applicant: HON HAI PRECISION INDUSTRY CO., LTD., New Taipei (TW)

(72) Inventors: I-Hua Chen, New Taipei (TW); Tung-Tso Tsai, New Taipei (TW); Chin-Pin Kuo, New Taipei (TW); Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 417 days.

(21) Appl. No.: 17/572,859

(22) Filed: Jan. 11, 2022

(65) Prior Publication Data
US 2022/0222799 A1   Jul. 14, 2022

(30) Foreign Application Priority Data
Jan. 12, 2021   (CN) .......................... 202110037669.8

(51) Int. Cl.
*G06T 7/00* (2017.01)
*G06F 18/214* (2023.01)
(Continued)

(52) U.S. Cl.
CPC ............ *G06T 7/001* (2013.01); *G06F 18/214* (2023.01); *G06F 18/22* (2023.01); *G06V 10/40* (2022.01);
(Continued)

(58) Field of Classification Search
None
See application file for complete search history.

(56) References Cited

U.S. PATENT DOCUMENTS

| 2019/0228312 A1* | 7/2019 | Andoni ............... G06F 18/2433 |
| 2019/0287230 A1* | 9/2019 | Lu .......................... G06N 3/088 |

(Continued)

FOREIGN PATENT DOCUMENTS

| CN | 108351600 B | * 10/2019 | ............... G03F 1/76 |

OTHER PUBLICATIONS

Tensorflow, "intro to Autoencoders", https://www.tensorflow.org/tutorials/generative/autoencoder, Sep. 20, 2020.*

(Continued)

*Primary Examiner* — Jiangeng Sun
(74) *Attorney, Agent, or Firm* — ScienBiziP, P.C.

(57) ABSTRACT

A method of detecting defects revealed in images of finished products includes importing flawless images into an autoencoder for model training and obtaining reconstructed images from them. The reconstructed images are compared with the flawless images to obtain groups of test errors. An error threshold is selected from the groups of the test errors according to preset rules. In practice, obtaining an image to be tested, and a reconstructed image to be tested, and an error to be tested; determining detection of the image to be tested according to the error and the error threshold; and importing the image into a classifier for defect classification if the image is found to reveal a defect. An electronic device and a non-volatile storage medium for performing the above-described method, are also disclosed.

17 Claims, 4 Drawing Sheets

(51) Int. Cl.
*G06F 18/22* (2023.01)
*G06V 10/40* (2022.01)
*G06V 10/764* (2022.01)
*G06V 10/82* (2022.01)

(52) U.S. Cl.
CPC ............ *G06V 10/764* (2022.01); *G06V 10/82* (2022.01); *G06T 2207/20081* (2013.01); *G06T 2207/20084* (2013.01); *G06T 2207/30108* (2013.01)

(56) References Cited

U.S. PATENT DOCUMENTS

| | | | |
|---|---|---|---|
| 2019/0303717 A1* | 10/2019 | Bhaskar | G06F 18/214 |
| 2020/0273210 A1* | 8/2020 | Nguyen | G06F 30/398 |
| 2020/0311895 A1* | 10/2020 | Sakurai | G06T 5/50 |
| 2021/0209418 A1* | 7/2021 | Badanes | G06V 10/454 |

OTHER PUBLICATIONS

Ireri,David et al.; A computer vision system for defect discrimination and grading in tomatoes using machine leaning and image processing; Apr. 21, 2019; 28-37 Pages.

Guo,Bingjun et al.; Bagging deep autoencoders with dynamic threshold for semi-supervised anomaly detection; Nov. 27, 2019; 1-8 Pages.

* cited by examiner

METHOD FOR DETECTING DEFECT IN PRODUCTS AND ELECTRONIC DEVICE USING METHOD

FIELD

The subject matter herein generally relates to the technical field of image analysis, in particular to defect detecting method and electronic device.

BACKGROUND

Defect detection is usually carried out on industrial products before packaging. With the arrival of deep learning in AI, the use of deep learning method for defect detection reduces the occurrence of errors in detection caused by manual operation. The supervised learning detection model needs to collect a large number of positive and negative samples and label them manually in the early stage, which has a large labor cost.

Therefore, there is a room for improvement in such testing.

BRIEF DESCRIPTION OF THE DRAWINGS

Implementations of the present disclosure will now be described, by way of embodiments, with reference to the attached figures.

DETAILED DESCRIPTION

Figure 1:
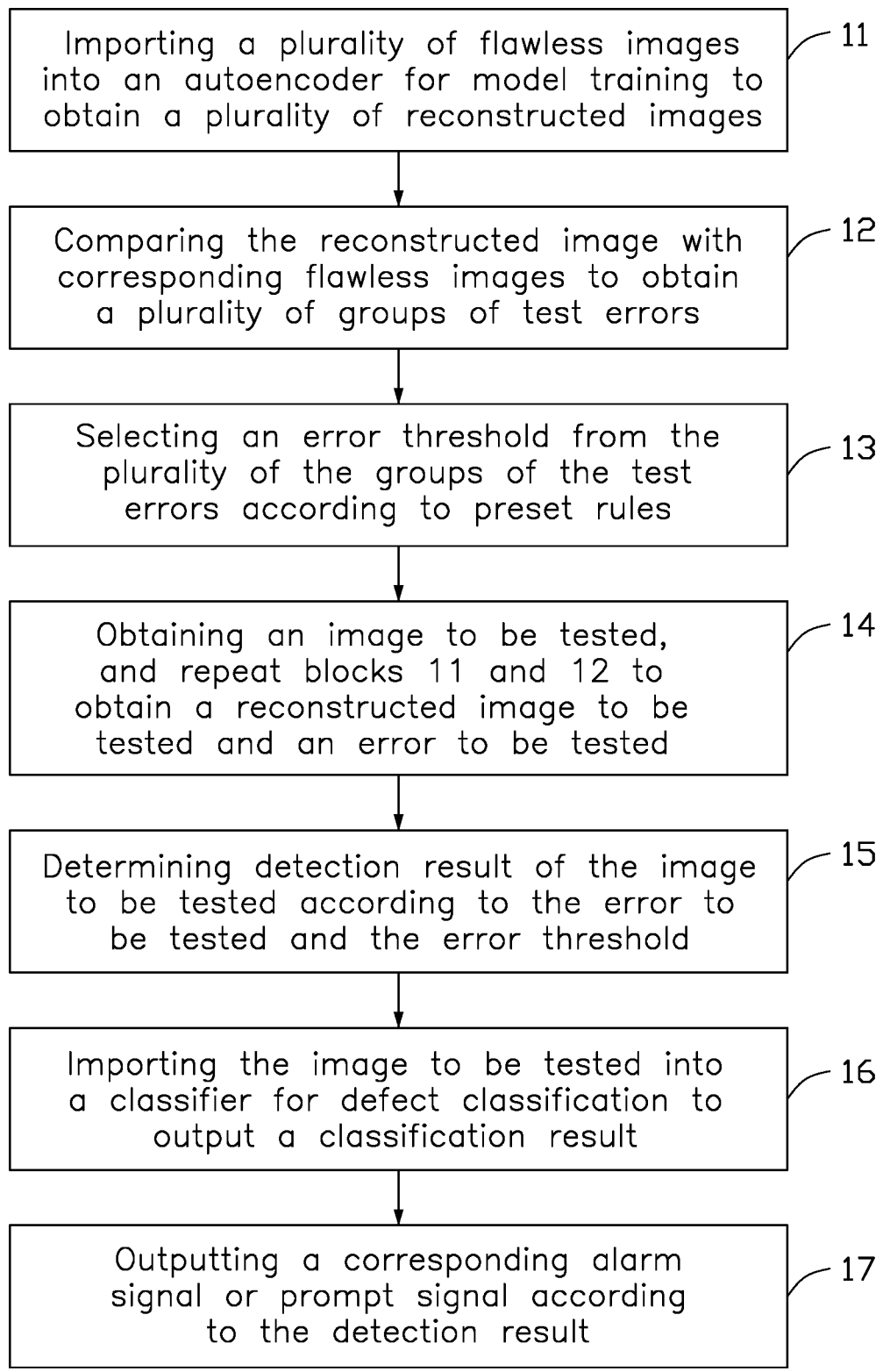
FIG. 1 is flowchart of an embodiment of a method for detecting defects according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a flow chart of one embodiment of a method for detecting defects in finished products.

Figure 5:
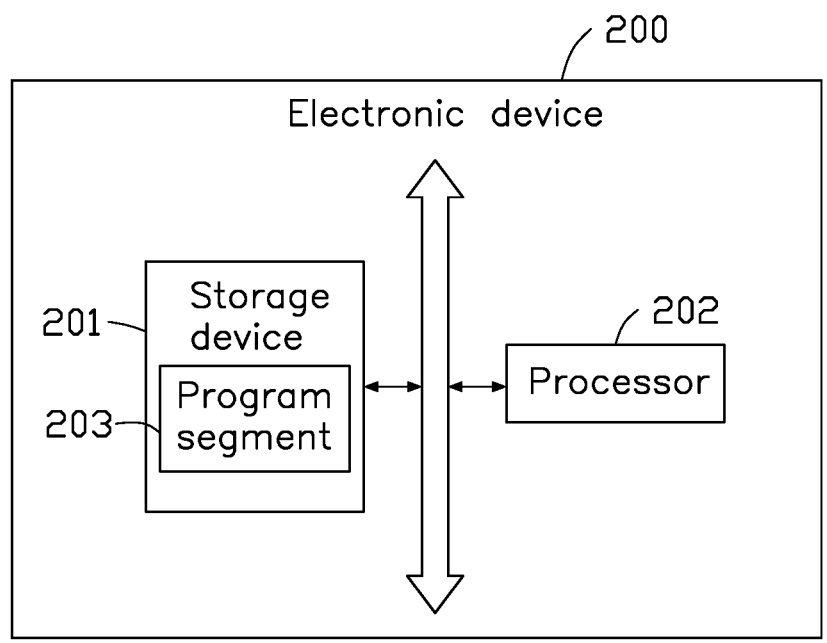
FIG. 5 is block diagram of an embodiment of an electronic device according to the present disclosure.

In one embodiment, the method can be applied to an electronic device 200 (shown in FIG. 5). The function for detecting provided by the method of the present disclosure can be directly integrated on the electronic device 200, or run on the electronic device 200 in the form of a software development kit (SDK).

As shown in FIG. 1, the method according to the embodiment of the present disclosure includes the following steps:

At block 11, importing a plurality of images of flawless products into an autoencoder for model training to obtain a plurality of reconstructed images.

The autoencoder is a kind of artificial neural networks (ANNs) used in semi supervised learning and unsupervised learning, and its function is to represent and learn the input information by taking the input information as the learning goal.

In the embodiment, the type of the autoencoder is not limited. For example, the autoencoder can be a contraction autoencoder, a regular autoencoder, or other types of the autoencoder.

The autoencoder includes an encoder and a decoder.

Figure 2:
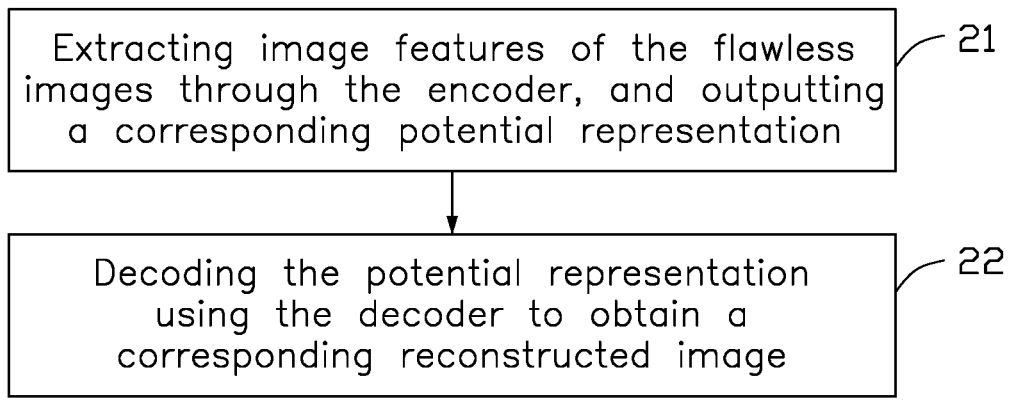
FIG. 2 is flowchart of another embodiment of a method for detecting defects according to the present disclosure.

In another embodiment, referring to FIG. 2, the block 11 may include the following specific steps:

At block 21, extracting features of the images of flawless products (flawless images) through the encoder, and outputting a potential representation.

At block 22, decoding the potential representation using the decoder to obtain a reconstructed image.

It can be understood that both the encoder and the decoder are parameterized equations, and the potential representation is the abstract features learned by the flawless images through the encoder. The potential representation represents the texture features of the imported flawless images.

At block 12, comparing the reconstructed image with corresponding flawless images to obtain a plurality of groups of test errors.

Figure 3:
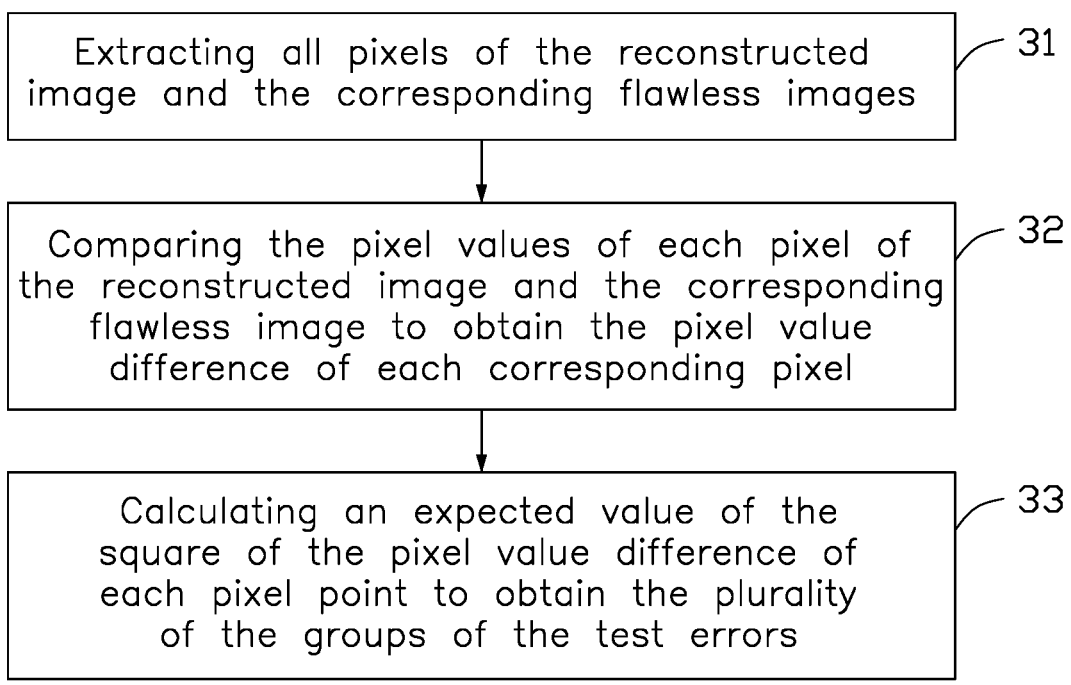
FIG. 3 is flowchart of another embodiment of a method for detecting defects according to the present disclosure.

In another embodiment, referring to FIG. 3, the block 12 may include the following specific steps:

At block 31, extracting all pixels of the reconstructed image and the corresponding flawless images.

At block 32, comparing the pixel values of each pixel of the reconstructed image and the corresponding flawless image to obtain differences in pixel values between the two images.

At block 33, calculating an expected value of the square of the pixel value difference of each pixel point to obtain the plurality of the groups of the test errors.

In other embodiments, before performing block 31, the reconstructed image and the flawless image can also be preprocessed to render consistency in the size and direction of the reconstructed image and the flawless image, so as to facilitate the subsequent execution of block 31 to block 33.

In this embodiment, the test error is the mean square error between the reconstructed image and the flawless image.

The embodiment of the present disclosure does not limit the type of the test error. For example, the test error can be a peak signal to noise ratio (PSNR) or a structural similarity (SSIM) index.

At block 13, selecting an error threshold from the plurality of the groups of the test errors according to preset rules.

In the embodiment, the preset rule includes drawing a cumulative distribution function according to a plurality of the groups of the test errors; obtaining a function value, finding the value of the variable corresponding to the function value in the cumulative distribution function, and setting the value of the variable as the error threshold.

The variable of the cumulative distribution function can be the test error, and the function value of the cumulative distribution function is any value in the [0,1] of the interval. The cumulative distribution function represents the probability of being less than a certain test error in the plurality of the groups of the test errors.

For example, in one embodiment, a cumulative distribution function is obtained by drawing a plurality of the groups of the test errors. A function value is obtained, for example, 0.9, and the test error corresponding to the function value in the cumulative distribution function is found, for example, 0.001, and 0.001 determined as the error threshold. It can be understood that in the distribution function, the function value of 0.9 and the corresponding variable of 0.001 mean that 90% of the test errors in the plurality of the groups are less than 0.001.

At block 14, obtaining an image to be tested, and repeating blocks 11 and 12 to obtain a reconstructed image to be tested and an error to be tested.

The method of obtaining the reconstructed image to be tested in block 14 is the same as that of obtaining the reconstructed image in block 11, and the method of obtaining the error to be tested in block 14 is the same as that of obtaining the test error in block 12, which will not be repeated here.

It can be understood that the error to be tested is the mean square error between the reconstructed image to be tested and the image to be tested.

In other embodiments, the error to be tested and the test error are the same type of error. The disclosure does not limit the type of the error to be tested. For example, the error to be tested can be a peak signal to noise ratio (PSNR) or a structural similarity (SSIM) index.

At block 15, determining result of the image to be tested according to the error to be tested and the error threshold.

When the error to be tested is less than or equal to the error threshold, the result is determined as being that the image to be tested is flawless. When the error to be tested is greater than the error threshold, the result is determined as being that the image to be measured is defective.

At block 16, importing the image to be tested into a classifier for defect classification to output a classification.

When the result is that the image to be tested is defective, the image to be tested is imported into a classifier for defect classification to output the classification.

It can be understood that the same kind of images to be tested may produce different types of defects in the process of practical production and application. For example, in images of tea as a product, different types of pathological defects can be present in tea due to different kinds of pests, creating spots of different colors and sizes on the leaves of tea. Thus, when the image to be tested is an image of tea, the classification includes various types of pests.

In the embodiment, the classifier may be a trained classification model. The type of the classifier is not limited. For example, the classifier can be a autoencoder, a full convolution neural network model, or other neural network model.

It can be understood that when the result is that the image to be tested is free of defects, the result is output to complete defect detection process.

In other embodiments, the defect detecting method also includes block 17.

At block 17, outputting an alarm signal or prompt signal according to the detection.

In other words, different corresponding measures can be taken according to the test results. For example, in the embodiment, when the result indicates a defect, a reminder information is generated according to the image to be tested, and the information is sent to the terminal device of the designated contact. The designated contact person may be a person responsible for quality and thus detecting the defects. Through the above embodiment, the designated contact can be notified in time when there is a defect found.

In the embodiment of the present disclosure, taking the input of the plurality of the flawless images, such as n flawless images, as an example, and the flawless image is an image of tea, the defect detecting method of the present disclosure is described in detail.

Firstly, N flawless images are imported into an autoencoder and recorded as flawless image 1, flawless image 2, flawless image 3 . . . , and flawless image N to obtain plurality of the corresponding reconstructed images, which are recorded as reconstructed image 1, reconstructed image 2, reconstructed image 3 . . . , and reconstructed image N. Then, the reconstructed image is compared with the flawless image to obtain a plurality of the groups of the test errors. For example, the reconstructed image 1 is compared with the flawless image 1 to obtain an error value of 0.01, which is recorded as test error 1; the reconstructed image 2 is compared with the flawless image 2 to obtain an error value of 0.02, which is recorded as test error 2; the reconstructed image 3 is compared with the flawless image 3 to obtain an error value of 0.001, which is recorded as test error 3; . . . ; the reconstructed image N is compared with the flawless image N is recorded as the test error N. The cumulative distribution function of the test error is drawn according to the N groups of test errors. The distribution interval of the test error is determined by the cumulative distribution function, and an error threshold is selected. For example, according to the cumulative distribution function, it can be established that the value of 90% of the N groups of the test errors is less than one of the test errors N, and the value of the test error N is recorded as the error threshold. The obtaining an image to be tested, inputting the image to be tested into the autoencoder to obtain a reconstructed image to be tested. Comparing the reconstructed image to be tested with the image to be tested to obtain an error to be tested. Comparing the error to be tested with the error threshold, and if the error to be tested is less than or equal to the error threshold, the result is determined as being that the image to be tested is flawless. If the error to be tested is greater than the error threshold, the result is determined as being that the image to be tested is defective. When the detection result is that the image to be tested is defective, the image to be tested is imported into a trained classifier to classify the defect type of the image to be tested. In the embodiment, since the image to be tested is an image of tea, the defect or defects of the image to be tested are the defects caused by insects, so the classification result output by the classifier is the pest type of the image to be tested. When the detection result is that the tea image to be tested is flawless, only the detection result is output.

The present disclosure uses the autoencoder for image reconstruction, and uses the plurality of the flawless images to train the autoencoder. When the image to be tested is imported into the autoencoder and the image to be tested contains defects, the autoencoder will repair the defects of the image to be tested and output a reconstructed image to be tested of the repaired defect area. Therefore, an error to be tested can be obtained according to the comparison between the reconstructed image to be tested and the image to be tested. When the error to be tested is greater than the error threshold, it is determined that the image to be tested is defective. The defect detecting method does not need negative samples and only needs to input defect-free images, so as to reduce the conventional early work of marking defects and effectively reduce the labor cost. On the other hand, the error threshold is obtained by the plurality of the groups of the test errors, which effectively improves the accuracy of the defect detecting method.

Figure 4:
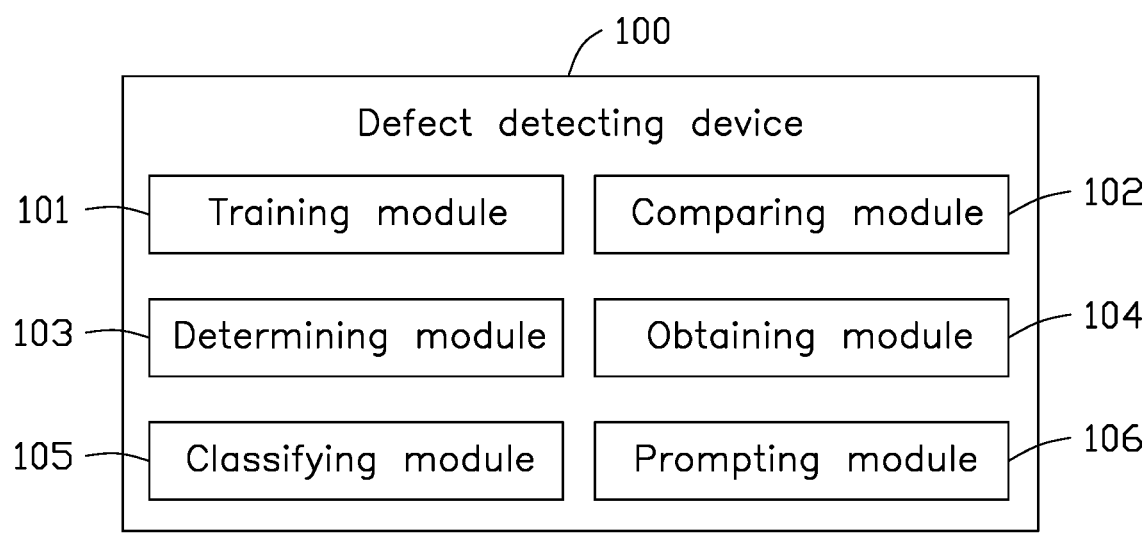
FIG. 4 is a block diagram of an embodiment of a device for detecting defects according to the present disclosure.

FIG. 4 illustrates a block diagram of one embodiment of a defect detecting device 100 according to the present disclosure.

The defect detecting device 100 includes a training module 101, a comparing module 102, a determining module 103, an obtaining module 104, and a classifying module 105.

The training module 101 is configured for importing a plurality of images of flawless products into an autoencoder for model training to obtain a plurality of reconstructed images.

The comparing module 102 is configured for comparing the reconstructed image with corresponding flawless images to obtain a plurality of groups of test errors.

The determining module 103 is configured for selecting an error threshold from the plurality of the groups of the test errors according to preset rules.

The obtaining module 104 is configured for obtaining an image to be tested, and repeating blocks 11 and 12 to obtain a reconstructed image to be tested and an error to be tested.

The comparing module 102 is configured for comparing the reconstructed image to be tested with the image to be tested to obtain an error to be tested.

The determining module 103 is configured for determining result of the image to be tested according to the error to be tested and the error threshold.

The classifying module 105 is configured for importing the image to be tested into a classifier for defect classification to output a classification when the detection result is that the image to be tested is defective.

The determining module 103 is configured for outputting the detection result when the detection result is that the image to be tested is flawless.

The defect detecting device 100 further includes a prompting module. The prompting module is configured for outputting a corresponding alarm signal or a prompt signal according to the result. For example, in the embodiment, when the result is defective, the prompting module 106 generates reminder information according to the image to be tested and sends the information to the terminal device of the designated contact. The designated contact person may be a quality person responsible for detecting the detection object. Through the above embodiment, the designated contact can be notified in time when there is a defect in the image to be tested.

The training module 101, the comparing module 102, the determining module 103, the obtaining module 104, the classifying module 105, and the prompting module 106 are used to jointly realize blocks 11 to 17 in the embodiment of the above defect detecting method, the specific implementation process of each functional module will not be repeated here, for details, please refer to blocks 11 to 17.

FIG. 5 illustrate an electronic device 200 in accordance with an embodiment of the present disclosure.

The electronic device 200 can further include, but is not limited to, a storage device 201, at least one processor 202, and a program segment 203 stored in the storage device 201.

The electronic device 200 may be any one of a smart phone, a tablet computer, a laptop convenient computer, an embedded computer, a desktop computer, a server, etc. It can be understood by those skilled in the art that the schematic diagram is only an example of the electronic device 200 and does not constitute a limitation on the electronic device 200. The electronic device 200 can include more or fewer components than the diagram, or combine some components, or different components.

The processor 202 may execute the program code of the program segment 203 to implement blocks 11-17 in method shown in FIG. 1. The processor 202 may execute the program code of the program segment 203 to implement blocks 21-22 in method shown in FIG. 2. The processor 202 may execute the program code of the program segment 203 to implement blocks 31-33 in method shown in FIG. 3. The processor 202 may execute the program code of the program segment 203 to implement the functions of a defect detecting device 100 shown in FIG. 4.

The modules 101-106 include computer instructions or codes in form of one or more programs that may be stored in the storage device 201, and which are executed by the at least one processor 202. In other embodiment, the modules 101-106 may also be a program instruction or firmware that is embedded in the processor 202.

The one or more modules may be a series of computer program instruction segments capable of completing specific functions, and the instruction segments are used to describe the execution process of the program segment 203 in the electronic device 200.

The block diagram merely shows an example of the electronic device 200 and does not constitute a limitation to the electronic device 200. In other examples, more or less components than those illustrated may be included, or some components may be combined, or different components used. For example, the electronic device 200 may also include input and output devices, a network access devices, a bus, and the like.

The processor 202 may be a central processing unit (CPU), or may be another general purpose processor, a digital signal processor (DSP), an application specific integrated circuit (ASIC), a Field-Programmable gate array (FPGA) or other programmable logic device, a transistor logic device, a discrete hardware component. The general purpose processor may be a microprocessor. The processor 202 may also be any conventional processor. The processor 202 is a control center of the electronic device 200. The processor 202 connects the parts of the electronic device 200 by using various interfaces and lines.

The storage device 201 can be used to store the program segment 203. The processor 203 operates or executes the program segment stored in the storage device 201 and recalls data stored in the storage device 201, and implements various functions of the electronic device 200. The storage device 201 may mainly include a storage program area and a storage data area, the storage program area may store an operating system, an application (such as sound playback and image playback) required for at least one function. The storage data area may store data created.

The storage device 201 may include a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The modules and units integrated by the electronic device 200, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media. It should be noted that the content contained in the computer readable medium can be appropriately increased or decreased according to the requirements of legislation and patent practice in jurisdictions. For example, in some jurisdictions, according to legislation and patent practice, the computer readable medium does not include electric carrier signals and telecommunication signals.

In several embodiments provided by the present disclosure, it should be understood that the disclosed electronic devices and methods can be realized in other ways. For example, the electronic device described above is only schematic. For example, the division of the modules is only according to logical function, and there may be another division mode in actual implementation.

Each functional module in each embodiment of the present disclosure can be integrated in the same processing module, each module can exist separately, or two or more modules can be integrated in the same module. The above integrated modules can be realized in the form of hardware or hardware plus software function modules.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for detecting defect comprising:
   importing a plurality of flawless images into an autoencoder for model training to obtain a plurality of reconstructed images;
   comparing the reconstructed images with the flawless images to obtain a plurality of groups of test errors;
   selecting an error threshold from the plurality of the groups of the test errors according to preset rules;
   obtaining an image to be tested, and a reconstructed image to be tested and an error to be tested;
   determining detection result of the image to be tested according to the error to be tested and the error threshold;
   importing the image to be tested into a classifier for defect classification to output a classification result when the image to be tested is defective;
   extracting all pixels of the reconstructed image and the flawless images;
   comparing the pixel values of each pixel of the reconstructed image and the flawless image respectively to obtain the pixel value difference of each pixel; and
   calculating an expected value of the square of the pixel value difference of each pixel point to obtain the plurality of the groups of the test errors.

2. The method according to claim 1, further comprising:
   extracting image features of the flawless images through the encoder, and outputting a corresponding potential representation;
   decoding the potential representation using the decoder to obtain a corresponding reconstructed image.

3. The method according to claim 1, wherein the test error is mean square error between the reconstructed image and the flawless image, and the error to be tested is the mean square error between the reconstructed image to be tested and the image to be tested.

4. The method according to claim 1, the preset rules comprising:
   drawing a cumulative distribution function according to the plurality of the groups of the test errors; and
   obtaining a function value, finding value of a variable corresponding to the function value in the cumulative distribution function, and setting the value of the variable as the error threshold.

5. The method according to claim 1, further comprising:
   determining the image to be tested is flawless when the error to be tested is less than or equal to the error threshold; or
determining the image to be tested is defective when the error to be tested is greater than the error threshold.

6. The method according to claim 5, further comprising:
   outputting the detection result when the detection result is that the image to be tested is flawless.

7. An electronic device, comprising:
   a storage device; and
   at least one processor, wherein the storage device stores one or more programs, when executed by the at least one processor, the one or more programs cause the at least one processor to:
      import a plurality of flawless images into an autoencoder for model training to obtain a plurality of reconstructed images;
      compare the reconstructed images with the flawless images to obtain a plurality of groups of test errors;
      select an error threshold from the plurality of the groups of the test errors according to preset rules;
      obtain an image to be tested, and a reconstructed image to be tested and an error to be tested;
      determine detection result of the image to be tested according to the error to be tested and the error threshold;
      import the image to be tested into a classifier for defect classification to output a classification result when the image to be tested is defective;
      extract all pixels of the reconstructed image and the flawless images;
      compare the pixel values of each pixel of the reconstructed image and the flawless image respectively to obtain the pixel value difference of each pixel; and
      calculate an expected value of the square of the pixel value difference of each pixel point to obtain the plurality of the groups of the test errors.

8. The electronic device according to claim 7, wherein the at least one processor is further caused to:

extract image features of the flawless images through the encoder, and output a corresponding potential representation;

decode the potential representation using the decoder to obtain a corresponding reconstructed image.

9. The electronic device according to claim 7, wherein the test error is mean square error between the reconstructed image and the flawless image, and the error to be tested is the mean square error between the reconstructed image to be tested and the image to be tested.

10. The electronic device according to claim 8, wherein the at least one processor is further caused to:

obtain state of charge (SOC) of the battery;

determine whether the SOC of the battery is within a SOC range; and activate a detection model if the SOC of the battery is within the SOC range.

11. The electronic device according to claim 7, wherein the at least one processor is further caused to:

draw a cumulative distribution function according to the plurality of the groups of the test errors; and obtain a function value, finding value of a variable corresponding to the function value in the cumulative distribution function, and set the value of the variable as the error threshold.

12. The electronic device according to claim 7, wherein the at least one processor is further caused to:

determine the image to be tested is flawless when the error to be tested is less than or equal to the error threshold; or determine the image to be tested is defective when the error to be tested is greater than the error threshold.

13. The electronic device according to claim 12, wherein the at least one processor is further caused to:

output the detection result when the detection result is that the image to be tested is flawless.

14. A non-transitory storage medium having stored thereon instructions that, when executed by a processor of a computer device installed in a vehicle device, causes the processor to perform an analyzing method, wherein the method comprises:

importing a plurality of flawless images into an autoencoder for model training to obtain a plurality of reconstructed images;

comparing the reconstructed images with the flawless images to obtain a plurality of groups of test errors;

selecting an error threshold from the plurality of the groups of the test errors according to preset rules;

obtaining an image to be tested, and a reconstructed image to be tested and an error to be tested;

determining detection result of the image to be tested according to the error to be tested and the error threshold;

importing the image to be tested into a classifier for defect classification to output a classification result when the image to be tested is defective;

extracting all pixels of the reconstructed image and the flawless images;

comparing the pixel values of each pixel of the reconstructed image and the flawless image respectively to obtain the pixel value difference of each pixel; and calculating an expected value of the square of the pixel value difference of each pixel point to obtain the plurality of the groups of the test errors.

15. The non-transitory storage medium according to claim 14, further comprising:

extracting image features of the flawless images through the encoder, and outputting a corresponding potential representation;

decoding the potential representation using the decoder to obtain a corresponding reconstructed image.

16. The non-transitory storage medium according to claim 7, wherein the test error is mean square error between the reconstructed image and the flawless image, and the error to be tested is the mean square error between the reconstructed image to be tested and the image to be tested.

17. The non-transitory storage medium according to claim 14, further comprising:

drawing a cumulative distribution function according to the plurality of the groups of the test errors; and obtaining a function value, finding value of a variable corresponding to the function value in the cumulative distribution function, and setting the value of the variable as the error threshold.

* * * * *